United States Patent
Soffritti et al.

(10) Patent No.: US 9,073,027 B2
(45) Date of Patent: Jul. 7, 2015

(54) PROCESS AND APPARATUS FOR THE GAS-PHASE POLYMERIZATION OF OLEFINS

(75) Inventors: Silvia Soffritti, Ferrara (IT); Riccardo Rinaldi, Mantova (IT); Maurizio Dorini, Porto Mantovano (IT); Giuseppe Penzo, Mantova (IT)

(73) Assignee: Basell Poliolefine Italia S.r.l., Milan (IT)

( * ) Notice: Subject to any disclaimer, the term of this patent is extended or adjusted under 35 U.S.C. 154(b) by 46 days.

(21) Appl. No.: 13/822,156

(22) PCT Filed: Sep. 2, 2011

(86) PCT No.: PCT/EP2011/065210
§ 371 (c)(1),
(2), (4) Date: Mar. 11, 2013

(87) PCT Pub. No.: WO2012/031986
PCT Pub. Date: Mar. 15, 2012

(65) Prior Publication Data
US 2013/0165605 A1 Jun. 27, 2013

Related U.S. Application Data

(60) Provisional application No. 61/403,367, filed on Sep. 14, 2010.

(30) Foreign Application Priority Data

Sep. 9, 2010 (EP) ..................................... 10175919

(51) Int. Cl.
*C08F 2/34* (2006.01)
*B01J 8/12* (2006.01)
(Continued)

(52) U.S. Cl.
CPC .............. *B01J 8/0085* (2013.01); *B01J 8/0055* (2013.01); *B01J 8/1827* (2013.01); *B01J 8/388* (2013.01);
(Continued)

(58) Field of Classification Search
USPC ............................... 526/65, 88, 918; 422/132
See application file for complete search history.

(56) References Cited

U.S. PATENT DOCUMENTS

| 4,419,965 A | 12/1983 | Garcia-Mallol et al. |
| 5,698,642 A | 12/1997 | Govoni et al. |

(Continued)

FOREIGN PATENT DOCUMENTS

| CN | 1688618 A | 10/2005 |
| DE | 810501 | 8/1951 |

(Continued)

OTHER PUBLICATIONS

Machine translation of DE 1887282U; publication date: Feb. 1964.*
(Continued)

*Primary Examiner* — Fred M Teskin

(57) ABSTRACT

A gas-phase polymerization reactor having interconnected polymerization zones comprising:—a riser through which the polymer particles flow upwards under fast fluidization conditions or transport conditions;—a downcomer through which the polymer particles flow downward in a densified form under the action of gravity, the bottom of said downcomer being connected to the lower region of said riser by means of a transport section, said transport section being designed as a bend descending from the downcomer to the riser.

13 Claims, 2 Drawing Sheets

(51) Int. Cl.
*B01J 19/24* (2006.01)
*B01J 8/00* (2006.01)
*B01J 8/18* (2006.01)
*B01J 8/38* (2006.01)
*B01J 8/44* (2006.01)
*C08F 10/02* (2006.01)
*C08F 210/06* (2006.01)
*C08F 110/06* (2006.01)

(52) U.S. Cl.
CPC . *B01J 8/44* (2013.01); *C08F 10/02* (2013.01); *B01J 2208/00274* (2013.01); *B01J 2208/00292* (2013.01); *B01J 2208/00557* (2013.01); *B01J 2208/00584* (2013.01); *B01J 2208/00681* (2013.01); *B01J 2208/0069* (2013.01); *B01J 2208/00707* (2013.01); *B01J 2219/0077* (2013.01); *C08F 110/06* (2013.01); *C08F 210/06* (2013.01)

(56) References Cited

U.S. PATENT DOCUMENTS

| | | |
|---|---|---|
| 6,689,845 B1 | 2/2004 | Govoni et al. |
| 8,129,483 B2 | 3/2012 | Cai et al. |
| 8,198,383 B2 | 6/2012 | Mazzucco et al. |
| 2004/0072971 A1 | 4/2004 | Govoni et al. |

FOREIGN PATENT DOCUMENTS

| | | |
|---|---|---|
| DE | 1887282 | 2/1964 |
| WO | WO-2004033505 A1 | 4/2004 |
| WO | WO 2009/080660 A1 * | 7/2009 |

OTHER PUBLICATIONS

Machine translation of DE 810501C; publication date: Aug. 1951.*
PCT International Search Report & Written Opinion mailed Dec. 23, 2011, for PCT/EP2011/065210.

* cited by examiner

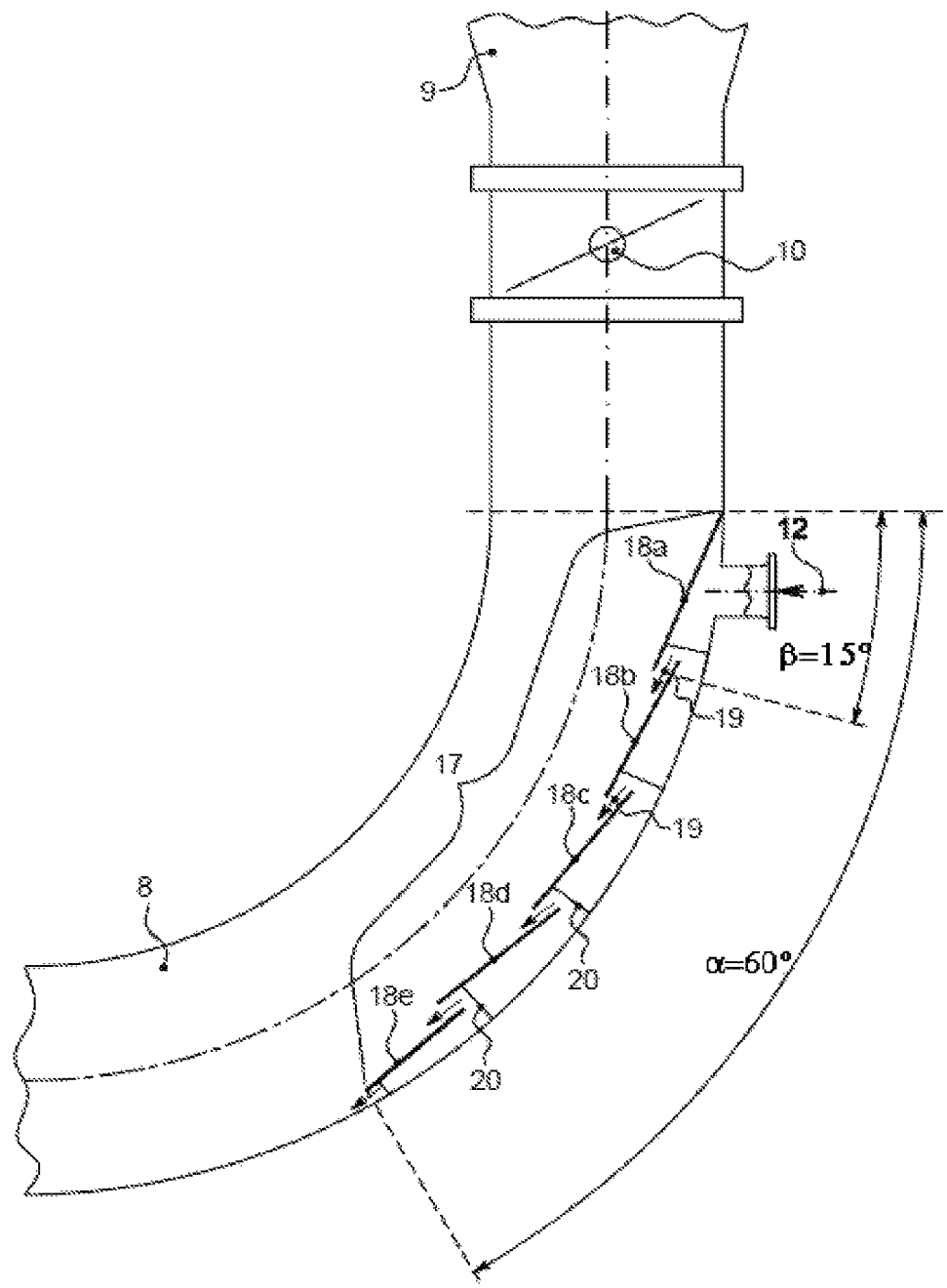

PROCESS AND APPARATUS FOR THE GAS-PHASE POLYMERIZATION OF OLEFINS

This application is the U.S. National Phase of PCT International Application PCT/EP2011/065210, filed Sep. 2, 2011, claiming priority of European Patent Application No. 10175919.9, filed Sep. 9, 2010 and the benefit under 35 U.S.C. 119(e) of U.S. Provisional Application No. 61/403,367, filed Sep. 14, 2010, the contents of which are incorporated herein by reference in their entirety.

BACKGROUND

The present invention relates to a process and apparatus for the gas-phase polymerization of olefins, the polymerization being performed in a reactor having interconnected polymerization zones. In particular, the present invention is addressed to improve the operability of such a polymerization reactor by means of a novel design relative to the transport section connecting the interconnected polymerization zones of the reactor.

A novel gas-phase process for the olefin polymerization, which represents a gas-phase technology alternative to the fluidized bed reactor technology, is disclosed in the Applicant's earlier EP-B-782587 and EP-B-1012195. This polymerization process is carried out in a gas-phase reactor having two interconnected polymerization zones. The polymer particles flow upwards through a first polymerization zone (denominated as "the riser") under fast fluidization or transport conditions, leave said riser and enter a second polymerization zone (denominated as "the downcomer"), through which they flow in a densified form under the action of gravity. A continuous circulation of polymer is established between the riser and the downcomer.

According to the description of EP-B-1012195 it is further possible to obtain, within this polymerization apparatus, two polymerization zones with a different monomers composition by feeding a gas/liquid stream (also denominated as "barrier stream") to the upper part of the downcomer. Said gas/liquid stream acts as a barrier to the gas phase coming from the riser, and is capable to establish a net gas flow upward in the upper portion of the downcomer. The established flow of gas upward has the effect of preventing the gas mixture present in the riser from entering the downcomer. This polymerization process, described in detail in EP-B-1012195, reveals particularly useful when bimodal homopolymers or copolymers are aimed to be prepared.

The disclosure of the successive patent EP-B-1720913 further improves the flowability of the polymer particles flowing in a densified form along the downcomer. In particular, the claimed method involves the introduction of a liquid of condensed monomers, which is continuously fed along the height of the downcomer at a mass flow rate per unity of reactor surface higher than 30 Kg/(h m$^2$). The percolation of this liquid onto the walls of the downcomer originates a liquid layer interposed between the polymer particles and the reactor wall, thus reducing the friction of the polymer onto the wall. As a result, the flowability of the polymer particles close to the downcomer walls is considerably improved. However, it has been discovered that the flow rate of descending liquid should not exceed certain values, otherwise the quick evaporation of relevant amounts of liquid in the downcomer may generate flows of vapor capable of locally fluidizing the polymer particles or locally generating a sluggish behavior of the descendent polymer. This clearly can disrupt the regular plug flow of the polymer along the downcomer, with the undesired effect of making non-homogeneous the residence time of the particles in the downcomer.

In order to overcome the above mentioned drawback, the description of WO2009/080660 tries to improve the operability of the downcomer highlighting the importance of a parameter, which is specific for a reactor having two interconnected polymerization zones. This parameter is the flow rate $F_P$ of polymer which is continuously transferred from the downcomer to the riser, thus establishing the continuous circulation of polymer between the two interconnected polymerization zones. The parameter $F_P$ may be also defined as the flow rate of polymer which by-passes the polymer discharge from the bottom part of the downcomer. According to the teaching of WO2009/080660 the amount of liquid barrier $L_B$ fed to the upper part of the downcomer should be strictly correlated with the flow rate $F_P$ of polymer continuously circulated between downcomer and riser. In particular, the ratio R between $F_P$ and $L_B$ should be maintained in a range comprised from 10 to 50, preferably from 15 to 45, in order to not disrupt the regular plug flow of the polymer descending along the downcomer, while at the same time ensuring a satisfying level of bimodality in the produced polyolefin.

However, another zone of high criticality in the correct working of the above polymerization reactor is represented by the transport section, which connects the bottom of the downcomer to the lower region of the riser and ensures the transfer of the polymer flow rate $F_P$. Along this section the polymer particles coming from the downcomer has to be transferred at a high speed to the lower region of the riser: the severe conditions of high temperature, pressure and the high level of friction between polymer and wall may easily cause superficial melting of the polymer particles with the consequent generation of polymer chunks inside the transport section. The transfer of polymer between downcomer and riser is generally achieved by means of pneumatic transport, i.e. by feeding a carrier gas to the inlet of the transport section. In order to achieve a more homogeneous distribution of the carrier gas within the transport section it may be useful to arrange a gas distribution grid. However, it has been observed that when such a distribution grid is arranged to cover only the inlet of such a carrier gas, a good flowability of the polymer along the transport section is not ensured. In fact, partial blocking in the polymer flow has been observed with consequent partial melting of the polymer and formation of agglomerates, which can also adhere onto the walls of the transport section. In the worst cases, the transport section may be even clogged by the presence of polymer agglomerates unable to reach the riser of the polymerization reactor.

It is therefore felt the need to improve the homogeneity of the polymer flow when passing from the downcomer to the riser along the transport section, so as to avoid obstructions and blocking in the flow of polymer circulated between the downcomer and the riser.

SUMMARY OF THE INVENTION

The Applicant has surprisingly found an innovative arrangement concerning the transport section, which connects the downcomer with the riser in a gas-phase reactor having two interconnected polymerization zones.

It is therefore a first object of the present invention a gas-phase polymerization reactor having interconnected polymerization zones comprising:
  a riser through which the polymer particles flow upwards under fast fluidization conditions or transport conditions;

a dowcomer through which the polymer particles flow downward in a densified form under the action of gravity, the bottom of said downcomer being connected to the lower region of said riser by means of a transport section, said transport section being designed as a bend descending from the downcomer to the riser;

said reactor being further provided with a line for feeding a carrier gas at the inlet of said transport section and with a gas distribution grid extending from the inlet of said transport section for an angle α of at least 50° along the bending of said transport section.

The polymerization reactor of present invention has a particular design arrangement which improves the operability of a gas-phase reactor having interconnected polymerization zones of the type disclosed in EP 782 587 and EP 1012195. As described in these prior art patents this polymerization reactor comprises two distinct polymerization zones, denominated the riser and the downcomer.

Fast fluidization conditions or transport conditions are established within the riser by feeding at the bottom end of the riser a gas mixture comprising one or more alpha-olefins, and optionally polymerization diluents, at a velocity higher than the transport velocity of the polymer particles. The velocity of said gas mixture is generally comprised between 0.8 and 10 m/s, preferably between 1.2 and 5.0 m/s. The terms "transport velocity", "transport conditions" and "fast fluidization conditions" are well known in the art: for a definition of these parameters reference is made, for example, to "D. Geldart, Gas Fluidisation Technology, page 155 et seq., J. Wiley & Sons Ltd., 1986".

Inside the second polymerization zone, i.e. the downcomer, the polymer particles flow downward in a densified form under the action of gravity, so that high values of density of the solid (mass of polymer per volume of reactor) are present inside the downcomer, said density of solid approaching the bulk density of the polymer. Throughout the present description a "densified form" of the polymer implies that the ratio between the mass of polymer particles and the reactor volume is higher than 80% of the "poured bulk density" of the obtained polymer. The "poured bulk density" of a polymer is a parameter well known to the person skilled in the art: it can be measured according to ASTM D1895/69. In view of the above explanation, it is clear that within the downcomer a plug flow of densified polymer flows downward and only small quantities of gas are entrained with the polymer particles.

Moreover, this polymerization reactor is designed in such a way that the upper portion of the riser is connected to a solid/gas separator, the bottom of which is further connected to the upper region of the downcomer. As it will be successively described in detail in reference to the enclosed Figures, the solid/gas separator is also connected through a gas recycle line to one ore more points of reintroduction of the recycled gas, which are placed in the lower region of the riser. Furthermore, a line for the catalyst feed is arranged on the riser and a polymer discharge system is generally located in the bottom portion of the downcomer.

The polymerization reactor of the invention further comprises a transport section connecting the bottom of the downcomer with the lower region of the riser. Said transport section results difficult to be managed, for the reason that the packed flow of densified polymer coming from the downcomer has to be conveyed along this transport section avoiding any formation of hot spots, any melting of polymer and any polymer deposition on the walls of this section. According to the invention, said transport section is designed as a bend descending from the downcomer to the riser, so that the inlet of the transport section is placed vertically above its outlet. The design as a bend, instead of a straight pipe, implies an arched shape with a suitable bending radius. The choice of a bend with a bending radius has been motivated by the fact that a gradual change in the direction of the polymer flow reduces the level of friction between the polymer particles and the wall of the transport section.

The polymerization reactor of the invention further comprises a line for feeding a carrier gas at the inlet of the transport section. The carrier gas ensures the pneumatic transport of the polymer along the transport section and it may be conveniently taken from the gas recycle line of the gas-phase reactor. In fact, part of the gas recycle stream, after being subjected to compression, may be fed to the inlet of the transport section with the function of "carrier gas". A large amount of carrier gas is introduced into the transport section, so as to make diluted the solid phase and to transfer it up to the riser.

When entering the transport section the carrier gas merges with the densified polymer coming from the downcomer. There is the need to achieve an optimal distribution of the carrier gas throughout the polymer mass, due to the fact that the polymer flow is forced to deviate along the bend of the transport section, thus being subjected to an increased friction between adjacent particles and also between the particles and the wall. If the flow of carrier gas is not homogeneously distributed, some zones of the transport section are not affected by the carrier gas, so that the friction between the polymer particles may cause a partial melting of the polymer, with generation of polymer chunks inside the transport section.

In order to avoid the above drawbacks the polymerization reactor of the invention further comprises a gas distribution grid, which extends along the bending of the transport section for an angle α of at least 50°. This means that in the innovative arrangement of present invention most of the bending radius of the transport section is covered by the gas distribution grid.

The expression "gas distribution grid" in the present description means a grid or a sequence of interconnected plates having the function of dispensing a flow of gas along a pipe.

The top end of the distribution grid is generally coincident with the inlet of the transport section itself. By way of an example, if the distribution grid extends for an angle α=60°, the remaining angle of 30° along the transport section is not covered by the distribution grid. It has been further found that the best conditions of operability are achieved when the distribution grid extends along the bending of the transport section for an angle α comprised in the range from 55° to 75°.

The comparative examples of present Application demonstrates that when the distribution grid extends along the transport section for an angle lower than 50°, for instance of 40°, after a short period of time the homogeneity of polymer flow along the transport section considerably decreases, with partial melting of the polymer and partial clogging of the transport section itself. On the contrary, when adopting the innovative design of the transport section of present invention, the transport section becomes operable with a regular and efficient transfer of polymer from the downcomer to the riser.

As regards the type of gas distribution grid to be used in the polymerization reactor of the invention, it is preferable to use a distribution grid formed by a plurality of trays fixed to the wall of the transport section, so as to form slits in the overlapping area of adjacent trays. The carrier gas fed to the inlet of the transport section passes through said slits formed in correspondence of adjacent trays.

According to a preferred embodiment, the angle comprised between the top end of the distribution grid and the first slit allowing the passage of gas through the grid should be lower than 25°, preferably said angle should be lower than 20°: in fact, it has been noticed that this particular arrangement improves the distribution of the carrier gas inside the solid phase of polymer, avoiding the formation of polymer chunks in the initial portion of the transport zone. The polymerization reactor of present invention will now be described in detail with reference to the enclosed figures, which have to be considered illustrative and not limitative of the scope of the invention.

BRIEF SUMMARY OF THE DRAWINGS

FIG. 2 is an enlarged view showing in detail the transport section equipped with the gas distribution grid according to the invention.

DETAILED DESCRIPTION

Figure 1:
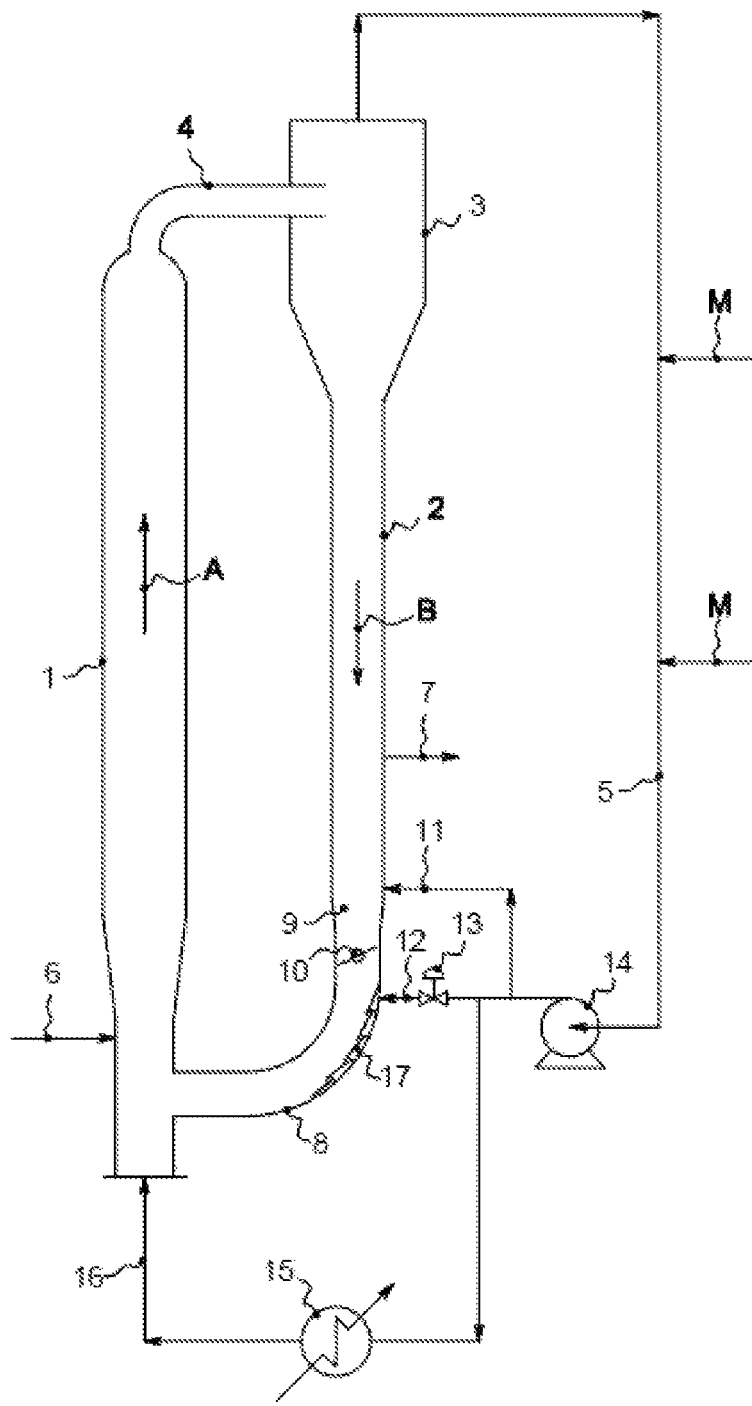
FIG. 1 is a diagrammatic representation of a polymerization reactor having two interconnected polymerization zones (riser and downcomer) and provided with the transport section of present invention.

The polymerization reactor shown in FIG. 1 comprises a first polymerization zone 1 (riser), wherein the polymer particles flow upward under fast fluidization conditions along the direction of the arrow A and a second polymerization zone 2 (downcomer), wherein the polymer particles flow downward under the action of gravity along the direction of the arrow B.

The upper portion of the riser 1 is connected to a solid/gas separator 3 by the interconnection section 4. The separator 3 removes most of the unreacted monomers from the polymer particles and the polymer withdrawn from the bottom of separator 3 enters the top portion of the downcomer 2. The separated unreacted monomers, optionally together with polymerization diluents, such as propane, flow up to the top of separator 3 and are successively recycled to the bottom of the riser 1 via the recycle line 5.

A gaseous mixture comprising one or more olefin monomers, hydrogen as the molecular weight regulator, propane as the polymerization diluent, is fed to the polymerization reactor via one or more lines M, which are suitably placed along the gas recycle line 5, according to the knowledge of the person skilled in art.

The catalyst components, preferably after a prepolymerization step, are continuously introduced into the riser 1 via line 6. The produced polymer can be discharged from the reactor via a line 7, which is advantageously placed on the lower portion of the downcomer 2: in fact, due to the packed flow of densified polymer, the quantity of gas entrained with the discharged polymer is minimised. By inserting a control valve (not shown in FIG. 1) on the polymer discharge line 7, it becomes possible to continuously control the flow rate of polymer produced by the polymerization reactor. Additional polymer discharge lines with respect to line 7 can conveniently be placed in the bottom part of the downcomer.

The polymerization reactor of present invention further comprises a transport section 8 connecting the bottom of downcomer 2 with the lower region of the riser 1. The bottom of the downcomer 2 converges into a slight restriction 9. Said slight restriction 9 is suitably troncoconically shaped and its walls form a vertical angle in a range of about 5 to 15°, preferably of around 10°. A control valve 10 with an adjustable opening is conveniently placed within or just below said restriction 9. When the control valve 10 is placed below said restriction, the distance between the two is suitably minimized. Also the distance between the control valve 10 and the upper part of the transport section 8 is suitably minimized. The flow rate Fp of polymer continuously circulated between the downcomer 2 and the riser 1 is adjusted by the level of opening of said control valve 10.

The control valve 10 may be a mechanical valve, such as a simple or double butterfly valve, a ball valve, etc. A stream of a gas, also denominated as the "dosing gas", is fed into the lower part of the downcomer 2 by means of a line 11 placed at a short distance above said restriction 9. For "short distance" it is intended a distance that is generally shorter than 1.5 times the diameter of the downcomer, preferably comprised between 0.6 and 1.3 times the diameter of the downcomer, more preferably between 0.7 and 1.0 times the diameter of the downcomer. Said line 11 can be conveniently split into multiple lines that can suitably be arranged around a section of the reactor, preferably in an even number (e.g. two, four, six, eight). The dosing gas to be introduced through line 11 is conveniently taken from the recycle line 5. The flow rate of dosing gas is adjusted by means of one or more control valves suitably arranged on line 11. In synthesis, the flow Fp of polymer particles circulated between downcomer 2 and riser 1 is conveniently adjusted by varying the opening of said control valve 10 at the bottom of the downcomer and/or by varying the flow rate of said dosing gas entering the downcomer via line 11.

According to the innovative arrangement of present invention the transport section 8 is designed as a bend descending from the bottom of downcomer 2 up to the lower region of the riser 1. Furthermore, a carrier gas is introduced via line 12 at the inlet of said transport section 8: the flow rate of carrier gas is adjusted by means of a control valve 13, which is suitably arranged on line 12.

Also the carrier gas is conveniently taken from the gas recycle line 5. Specifically, the gas recycle stream of line 5 is first subjected to compression by means of a compressor 14 and only a minor percentage of said recycle stream passes through line 12, thus entering the transport section 8 and diluting the solid phase of polymer flowing through the transport section 8. Most of the recycle stream, downstream the compressor 14, is subjected to cooling in a heat exchanger 15 and successively is introduced via line 16 at the bottom of the riser 1 at a high velocity, such to ensure fast fluidization conditions in the polymer bed flowing along the riser 1.

The carrier gas merges with the densified polymer coming from downcomer 2 at the inlet portion of transport section 8, after exiting the slits of the gas distribution grid 17. In the embodiment shown in FIG. 1 the top end of the distribution grid 17 is coincident with the inlet of the transport section 8 and said distribution grid 17 extends along the bending of said transport section 8 for an angle α=60°.

The gas distribution grid 17 is formed by a plurality of trays fixed to the transport section 8 in a way to form slits in the overlapping area of adjacent trays.

For a best understanding of the design arrangement of the gas distribution grid the below definitions for "tray", "slit" and "overlapping area" are given.

The term "tray" means a flat component, like a plate or a sheet, fixed to the wall of the transport section, in such a way that two adjacent trays generate an overlapping area.

The term "overlapping area" indicates the area formed by the overlapping of two adjacent trays.

The term "slit" indicates a long and narrow opening generated by the overlapping area of two adjacent trays.

FIG. 2 is an enlarged view showing in detail a preferred embodiment of the transport section 8 according to the invention. It shows the bottom of the downcomer 2 converging into the restriction 9, and the control valve 10 arranged within said restriction 9. Downstream the restriction 9 the transport section 8 is shaped as a descending bend connecting the bottom of the downcomer to the riser.

The carrier gas coming from the gas recycle line enters the transport section 8 via line 12 and runs into the distribution grid 17, so that it is forced to pass through the slits 19 existing between two adjacent trays 18 (18a, 18b, 18c, 18d or 18e). The shape of said slits 19 is such to give an outlet flow of gas, which is tangential at the plane of two adjacent trays 18.

In the overlapping area of adjacent trays a first tray 18a forms the upper part of said slits, while the successive tray 18b forms the bottom part of said slits 19. The slits 19 have an elongated shape, preferably rectangular or trapezoidal.

Generally, the number of slits 19 along the distribution grid 17 ranges preferably from 3 to 10. According to the specific embodiment of FIG. 2 the distribution grid 17 is formed by a sequence of five trays 18, arranged in such a way to cover the bending radius of the transport section 8 for a total angle α of 60°. Only the last slit 19 is not formed by the overlapping of adjacent trays, but the gas outlet takes place in the space existing from the last tray 18e and the bottom wall of the transport section 8. As a consequence, the distribution grid 17 in FIG. 2 comprises five slits 19.

The carrier gas can flow through the sequence of slits 19, due to the pressure gradient generated by the recycle compressor 14 arranged on the gas recycle line 5 (as shown in FIG. 1). According to the preferred embodiment of FIG. 2, the first slit 19 allowing the passage of carrier gas through the grid is advantageously positioned at an angle β of 20° C. starting from the top end of the distribution grid 17.

The trays 18 of the distribution grid 17 are held supported by means of little bars 20 protruding from the bottom wall of the transport section 8. The trays 18 may be manufactured of any useful material able to resist at temperatures and pressures of a polymerization process. It is preferred to use steel trays, since they can be easily manufactured and mounted each other to form slits in their overlapping area. Besides withstanding high values of temperature and pressure, steel also show a low roughness and this property helps to minimize the friction of the polymer particles on the trays of the distribution grid.

The gas-phase polymerization reactor, described in connection with above FIGS. 1-2, enables to carry out the polymerization of olefins minimizing the risk of having solid obstructions in the transfer section connecting the bottom of the downcomer with the riser.

It is therefore a second object of the invention a gas-phase process for the polymerisation of olefins in the presence of a solid catalyst component and a catalyst activator, the process being performed in a gas-phase reactor having interconnected polymerization zones, where the polymer particles flow upward through a first polymerization zone (riser) under fast fluidization or transport conditions, leave said riser and enter a second polymerization zone (downcomer) through which they flow downward in a densified form under the action of gravity, the process being characterized in that:
  the polymer particles leave the bottom of said downcomer and are reintroduced into the riser by flowing along a transport section designed as a bend descending from said downcomer to said riser;
  a carrier gas is fed at the inlet of said transport section for pneumatically transferring the polymer along said transport section, said carrier gas passing through the slits of a gas distribution grid, which extends from the inlet of said transport section for an angle α of at least 50° along the bending of said transport section.

As explained in connection with FIG. 1, the flow rate $F_P$ of polymer flowing along the transport section of present invention is adjusted by varying the opening of the control valve 10 placed in the restriction 9 at the bottom of the downcomer and/or by varying the flow rate of the dosing gas entering via line 11 the bottom of the downcomer. The higher is the plant productivity, the higher is the flow rate $F_P$ of polymer flowing along the transport section of present invention. In case of polymerization in an industrial plant $F_P$ may vary according to a broad range, being comprised between 100 t/h and 5000 t/h. Generally, the ratio between the flow rate $F_P$ of circulated polymer and the flow rate of polymer discharged from the reactor ranges from 10 to 100, preferably from 25 to 70.

The operating parameters, such as temperature and pressure, are those that are usual in gas-phase catalytic polymerization processes. For example, in both riser and downcomer the temperature is generally comprised between 60° C. and 120° C., while the pressure can ranges from 5 to 50 bar.

The carrier gas is conveniently taken from the gas recycle line of the polymerization reactor. The recycle gas stream generally comprises, besides the gaseous monomers, also inert polymerization components, such as for instance nitrogen, propane, etc and also molecular weight regulators, such as hydrogen.

By means of the design of distribution grid described in the present Application the amount of carrier gas needed to ensure a good flowabilty of the polymer is optimized with respect to the case of a distribution grid extending for a short angle. According to the process of the invention, the ratio $F_G/F_P$ between the mass flow rate $F_G$ of said carrier gas and the mass flow rate $F_P$ of polymer flowing along the transport section is preferably comprised in a range from 0.05 to 0.60, more preferably from 0.07 to 0.15.

The gas-phase polymerization process of the invention allows the preparation of a large number of polyolefins. Examples of polymers that can be obtained are:
  high-density polyethylenes (HDPEs having relative densities higher than 0.940) including ethylene homopolymers and ethylene copolymers with α-olefins having 3 to 12 carbon atoms;
  linear polyethylenes of low density (LLDPEs having relative densities lower than 0.940) and of very low density and ultra low density (VLDPEs and ULDPEs having relative densities lower than 0.920 down to 0.880) consisting of ethylene copolymers with one or more α-olefins having 3 to 12 carbon atoms;
  elastomeric terpolymers of ethylene and propylene with minor proportions of diene or elastomeric copolymers of ethylene and propylene with a content of units derived from ethylene of between about 30 and 70% by weight;
  isotactic polypropylene and crystalline copolymers of propylene and ethylene and/or other α-olefins having a content of units derived from propylene of more than 85% by weight;
  isotactic copolymers of propylene and α-olefins, such as 1-butene, with an α-olefin content of up to 30% by weight;
  impact-resistant propylene polymers obtained by sequential polymerisation of propylene and mixtures of propylene with ethylene containing up to 30% by weight of ethylene;
  atactic polypropylene and amorphous copolymers of propylene and ethylene and/or other α-olefins containing more than 70% by weight of units derived from propylene.

According to a specific embodiment of the process of the invention, the two interconnected polymerization zones, i.e. the riser and the downcomer, may be operated in such a way that the gas mixture coming from the riser is partially prevented from entering the downcomer. This effect may be accomplished by introducing into the upper part of the downcomer a gas/liquid stream having a composition different from the gaseous mixture present in the riser. Accordingly, one or more lines for feeding said gas/liquid stream may be arranged at the top portion of the downcomer.

In case of feeding a liquid mixture to the upper part of the downcomer, the partial evaporation of said liquid mixture generates in the upper part of the downcomer a flow of gas, which moves counter-currently to the flow of descendent polymer, thus acting as a barrier to the gas mixture coming from the riser and entrained among the polymer particles. The established upward flow of gas has the effect of preventing the gas mixture present in the riser from entering the downcomer. The liquid mixture of different composition to be fed at the upper part of the downcomer can be sprinkled over the surface of the polymer particles.

This particular process set-up causes a difference in the concentration of (co)monomers and/or hydrogen (molecular weight regulator) between the riser and the downcomer, so that polyolefin blends may be obtained from the reactor with a large flexibility as regards the mutual ratio of the (co) polymer components contained in the blend. Examples of bimodal polyolefins that can be obtained are:

bimodal polyethylene blends comprising a low molecular weight fraction and a high molecular weight fraction;

bimodal polypropylene blends comprising a low molecular weight fraction and a high molecular weight fraction;

polypropylene blends containing a propylene homopolymer and a random copolymer deriving from copolymerization of propylene with little amounts, up to 15% by wt, of comonomers selected from ethylene, 1-butene and 1-hexene;

The above mentioned bimodal polyethylene blends are particularly suitable to be subjected to injection molding for preparing shaped articles. The above mentioned polypropylene blends may be used to prepare films and fibers.

The polymerization process of the present invention can be carried out upstream or downstream other conventional polymerization technologies (either in a liquid-phase or a gas-phase) to give rise a sequential multistage polymerization process. For instance, a fluidised bed reactor can be used to prepare a first polymer component, which is successively fed to the gas-phase reactor of FIG. 1 to prepare a second and a third polymer component.

It is therefore a further object of the invention a multistage process for the gas-phase polymerization of olefins, which is carried out in a sequence of an upstream fluidised bed reactor and a downstream gas-phase polymerization reactor having interconnected polymerization zones as claimed in present application.

The gas-phase polymerization process herewith described is not restricted to the use of any particular family of polymerization catalysts. The invention is useful in any exothermic polymerization reaction employing any catalyst, whether it is supported or unsupported, and regardless of whether it is in pre-polymerized form.

The polymerization reaction can be carried out in the presence of highly active catalytic systems, such as Ziegler-Natta catalysts, single site catalysts, chromium-based catalysts, vanadium-based catalysts.

A Ziegler-Natta catalyst system comprises the catalysts obtained by the reaction of a transition metal compound of groups 4 to 10 of the Periodic Table of Elements (new notation) with an organometallic compound of group 1, 2, or 13 of the Periodic Table of element.

In particular, the transition metal compound can be selected among compounds of Ti, V, Zr, Cr, and Hf. Preferred compounds are those of formula $Ti(OR)_n X_{y-n}$ in which n is comprised between 0 and y; y is the valence of titanium; X is halogen and R is a hydrocarbon group having 1-10 carbon atoms or a COR group. Among them, particularly preferred are titanium compounds having at least one Ti-halogen bond such as titanium tetrahalides or halogenalcoholates. Preferred specific titanium compounds are $TiCl_3$, $TiCl_4$, $Ti(OBu)_4$, $Ti(OBu)Cl_3$, $Ti(OBu)_2Cl_2$, $Ti(OBu)_3Cl$.

Preferred organometallic compounds are the organo-Al compounds and in particular Al-alkyl compounds. The alkyl-Al compound is preferably chosen among the trialkyl aluminum compounds such as for example triethylaluminum, tri-isobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$ optionally in mixture with said trialkyl aluminum compounds.

Particularly suitable high yield ZN catalysts are those wherein the titanium compound is supported on magnesium halide in active form which is preferably $MgCl_2$ in active form. Particularly for the preparation crystalline polymers of $CH_2CHR$ olefins, where R is a C1 C10 hydrocarbon group, internal electron donor compounds can be supported on the $MgCl_2$. Typically, they can be selected among esters, ethers, amines, and ketones. In particular, the use of compounds belonging to 1,3-diethers, cyclic ethers, phthalates, benzoates, acetates and succinates is preferred.

When it is desired to obtain a highly isotactic crystalline polypropylene, it is advisable to use, besides the electron-donor present in the solid catalytic component, an external electron-donor (ED) added to the aluminium alkyl co-catalyst component or to the polymerization reactor. These external electron donors can be selected among alcohols, glycols, esters, ketones, amines, amides, nitriles, alkoxysilanes and ethers. The electron donor compounds (ED) can be used alone or in mixture with each other. Preferably the ED compound is selected among aliphatic ethers, esters and alkoxysilanes. Preferred ethers are the C2-C20 aliphatic ethers and in particular the cyclic ethers preferably having 3-5 carbon atoms, such as tetrahydrofurane (THF), dioxane.

Preferred esters are the alkyl esters of C1-C20 aliphatic carboxylic acids and in particular C1-C8 alkyl esters of aliphatic mono carboxylic acids such as ethylacetate, methyl formiate, ethylformiate, methylacetate, propylacetate, i-propylacetate, n-butylacetate, i-butylacetate.

The preferred alkoxysilanes are of formula $R_a^1 R_b^2 Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a $C_1$-$C_{10}$ alkyl group, in particular methyl.

Other useful catalysts are the vanadium-based catalysts, which comprise the reaction product of a vanadium compound with an aluminum compound, optionally in the presence of a halogenated organic compound. Optionally the vanadium compound can be supported on an inorganic carrier, such as silica, alumina, magnesium chloride. Suitable vanadium compounds are $VCl_4$, $VCl_3$, $VOCl_3$, vanadium acetyl acetonate.

Other useful catalysts are those based on chromium compounds, such as chromium oxide on silica, also known as Phillips catalysts.

Other useful catalysts are single site catalysts, for instance metallocene-based catalyst systems which comprise:

at least a transition metal compound containing at least one π bond;
at least an alumoxane or a compound able to form an alkyl-metallocene cation; and
optionally an organo-aluminum compound.

A preferred class of metal compounds containing at least one π bond are metallocene compounds belonging to the following formula (I):

$$Cp(L)_q AMX_p \qquad (I)$$

wherein M is a transition metal belonging to group 4, 5 or to the lanthanide or actinide groups of the Periodic Table of the Elements; preferably M is zirconium, titanium or hafnium;

the sub stituents X, equal to or different from each other, are monoanionic sigma ligands selected from the group consisting of hydrogen, halogen, $R^6$, $OR^6$, $OCOR^6$, $SR^6$, $NR^6_2$ and $PR^6_2$, wherein $R^6$ is a hydrocarbon radical containing from 1 to 40 carbon atoms; preferably, the substituents X are selected from the group consisting of —Cl, —Br, -Me, -Et, -n-Bu, -sec-Bu, -Ph, -Bz, —CH$_2$SiMe$_3$, —OEt, —OPr, —OBu, —OBz and —NMe$_2$;

p is an integer equal to the oxidation state of the metal M minus 2;

n is 0 or 1; when n is 0 the bridge L is not present;

L is a divalent hydrocarbon moiety containing from 1 to 40 carbon atoms, optionally containing up to 5 silicon atoms, bridging Cp and A, preferably L is a divalent group $(ZR^7_2)_n$; Z being C, Si, and the $R^7$ groups, equal to or different from each other, being hydrogen or a hydrocarbon radical containing from 1 to 40 carbon atoms;

more preferably L is selected from Si(CH$_3$)$_2$, SiPh$_2$, SiPhMe, SiMe(SiMe$_3$), CH$_2$, (CH$_2$)$_2$, (CH$_2$)$_3$ or C(CH$_3$)$_2$;

Cp is a substituted or unsubstituted cyclopentadienyl group, optionally condensed to one or more substituted or unsubstituted, saturated, unsaturated or aromatic rings;

A has the same meaning of Cp or it is a $NR^7$, —O, S, moiety wherein $R^7$ is a hydrocarbon radical containing from 1 to 40 carbon atoms;

Alumoxanes used as component b) are considered to be linear, branched or cyclic compounds containing at least one group of the type:

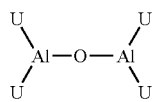

wherein the substituents U, same or different, are defined above.

In particular, alumoxanes of the formula:

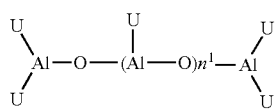

can be used in the case of linear compounds, wherein $n^1$ is 0 or an integer of from 1 to 40 and where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number; or alumoxanes of the formula:

can be used in the case of cyclic compounds, wherein $n^2$ is an integer from 2 to 40 and the U substituents are defined as above.

The catalyst may suitably be employed in the form of a pre-polymer powder prepared beforehand during a pre-polymerization stage with the aid of a catalyst as described above. The pre-polymerization may be carried out by any suitable process, for example, polymerization in a liquid hydrocarbon diluent or in the gas phase using a batch process, a semi-continuous process or a continuous process.

The following examples will further illustrate the present invention without limiting its scope.

EXAMPLES

Characterization

Melt Flow Index, condition L (MIL): determined according to ISO 1133 (230° C./ 5 Kg);

Ethylene content: determined by IR spectroscopy;

Example 1

Preparation of Polypropylene

Polypropylene is prepared by means of the gas-phase reactor having two interconnected polymerization zones and the transport section, as claimed in the present patent application.

A Ziegler-Natta catalyst is used as the polymerization catalyst comprising:

a titanium solid catalyst component prepared with the procedure described in EP 728 769, Example 5, lines 46 to 53, according to which di-isobutyl phthalate is used as an internal donor compound;
triethylaluminium (TEAL) as a cocatalyst;
dicyclopentyldimethoxysilane as an external donor.

The above components are pre-contacted in a pre-activation vessel at a temperature of 15° C. for 10 minutes with a weight ratio TEAL/(solid catalyst component) of 5 and a weight ratio TEAL/(external donor) of 4.

The gas-phase polymerization reactor comprises a first polymerization zone (riser) and a second polymerization zone (downcomer). Propylene is polymerized using H$_2$ as molecular weight regulator and propane as an inert polymerization diluent.

The polymerization is carried out at a temperature of 75° C. and at an absolute pressure of 29 bar.

As shown in FIG. 1, the activated catalyst is fed via line 6 to the riser 1 and the polyolefin particles are continuously circulated from bottom of the downcomer 2 to the riser 1 by means of the transport section 8, which is designed as a descending bend.

The transport section 8 is provided with a gas distribution grid 17, which extends along the bending of the transport section, as clearly shown in FIGS. 1 and 2.

In this specific polymerization run the gas distribution grid 17 extends along the bending of the transport section 8 for an angle α=60°. The distribution grid is formed by a sequence of four trays 18, which are fixed to the wall of the transport section, so as to form slits 19 in the overlapping area of adjacent trays. The angle comprised between the top end of the distribution grid and the first slit is β=20°.

A carrier gas is fed via line 12 to the inlet of the transport section 8 for pneumatically transferring the particles of polypropylene along the transport section. This carrier gas is conveniently derived from the gas recycle line 5 of the gas-phase reactor, continuously recycling the unreacted monomer to the reactor, so that the carrier gas has the same composition of the gas present inside the riser 1 and the downcomer 2. In this polymerization run the carrier gas has the following molar composition: propylene 91%; propane 8.0%; hydrogen 1.0%.

The carrier gas passes through the slits 19 of the gas distribution grid 8 and successively merges with the polymer particles coming from the downcomer 2 ensuring the polymer transfer up to the riser 1 along the distribution grid 8. The flow rate $F_P$ of polymer circulated along the transport section 8 is of 500 t/h.

The flow rate $F_G$ of said carrier gas continuously introduced into the transport section 8 via line 12 is of 110 t/h, so that the ratio $F_G/F_P$ results equal to 0.22.

The produced polypropylene is continuously discharged from the bottom of the downcomer via line 7 with a flow rate of 20 t/h (reactor productivity). The obtained polypropylene has a melt Index MIL of 10 (g/10 min).

It is observed that the design of the transport section according to the invention ensures a regular and reliable transfer of the propylene flow rate Fp from the downcomer up to the riser. The polymer flowability throughout the transport section is maintained optimal in the time, without any formation of polymer agglomerates inside the transport section.

Example 2

Preparation of a Propylene/Ethylene Copolymer

The same Ziegler-Natta catalyst system of Example 1 is used, pre-activated with the same modality indicated in Example 1.

The activated catalyst is fed to the gas-phase polymerization reactor, where propylene and ethylene are polymerized using $H_2$ as the molecular weight regulator, and propane as an inert diluent. The polymerization is carried out at a temperature of 75° C. and at an absolute pressure of 29 bar.

As shown in FIG. 1, the activated catalyst is fed via line 6 to the riser 1 and the polyolefin particles are continuously circulated from bottom of the downcomer 2 to the riser 1 by means of the transport section 8, which is designed as a descending bend.

The transport section 8 is provided with a gas distribution grid 17, which extends along the bending of the transport section.

In this specific example the gas distribution grid 17 extends along the bending of the transport section 8 for an angle α of 75°. Furthermore, the distribution grid 17 is formed by a sequence of five trays 18, which are fixed to the wall of the transport section, so as to form slits 19 in the overlapping area of adjacent trays. The angle comprised between the initial end of the distribution grid and the first slit is β=15°.

A carrier gas is fed via line 12 to the inlet of the transport section 8 for pneumatically transferring the particles of polypropylene along the transport section. In this polymerization run the carrier gas has the following molar composition: propylene 87%; ethylene 2.0%; propane 8.0%; hydrogen 3.0%.

The carrier gas passes through the slits 19 of the gas distribution grid 8 and successively merges with the polymer particles coming from the downcomer 2 ensuring the polymer transfer up to the riser 1 along the distribution grid 8. The flow rate $F_P$ of propylene/ethylene copolymer circulated along the transport section 8 is of 1700 t/h.

The flow rate $F_G$ of said carrier gas continuously introduced into the transport section 8 via line 12 is of 150 t/h, so that the ratio $F_G/F_P$ results equal to 0.088.

The produced copolymer is continuously discharged from the bottom of the downcomer via line 7 with a flow rate of 30 t/h (reactor productivity).

The obtained copolymer has an ethylene content of 3.5% by weight and a Melt Index MIL of 10 (g/10 min).

Also in this case the design of the transport section according to the invention ensures a regular and reliable transfer of the propylene/ethylene copolymer from the downcomer up to the riser. The copolymer flowability throughout the transport section is maintained optimal in the time, without any formation of polymer agglomerates inside the transport section.

Example 3 (Comparative)

This polymerization run is aimed to prepare the same propylene/ethylene copolymer of example 2 using the same Ziegler-Natta catalyst and polymerization conditions as described in connection with example 2 (T=75° C.; p=29 bar).

The activated catalyst is fed to the riser and the polyolefin particles are continuously circulated from bottom of the downcomer to the riser by means of the transport section, which is designed as a descending bend.

A carrier gas is fed to the inlet of the transport section 8 for pneumatically transferring the particles of polypropylene along the transport section. In this polymerization run the carrier gas has the same molar composition of example 2: propylene 87%; ethylene 2.0%; propane 8.0%; hydrogen 3.0%.

Likewise the flow rate $F_P$ of polymer circulated along the transport section is equal to 1700 t/h and the flow rate $F_G$ of the carrier gas is of 150 t/h.

However, in this specific comparative example the transport section is operated without arranging any gas distribution grid onto the bending of the transport section.

It is observed that after a short period of time, of about 2 hours, the transfer of the copolymer along the transport section becomes problematic, with partial melting of the copolymer particles and consequent formation of polymer chunks inside the transport section. The generation of several polymer chunks finally causes the clogging of the transport section itself, making inoperable the polymerization reactor due to halt of polymer circulation between the downcomer and the riser.

Example 4 (Comparative)

This polymerization run is aimed to prepare the same propylene/ethylene copolymer of Example 2 using the same Ziegler-Natta catalyst and polymerization conditions of Example 2. The activated catalyst is fed to the riser and the polyolefin particles are continuously circulated from bottom of the downcomer to the riser by means of the transport section, which is designed as a descending bend.

A carrier gas is fed to the inlet of the transport section 8 for pneumatically transferring the particles of polypropylene along the transport section. In this polymerization run the carrier gas has the same molar composition of example 2: propylene 87%; ethylene 2.0%; propane 8.0%; hydrogen 3.0%.

Likewise the flow rate $F_P$ of polymer circulated along the transport section is equal to 1700 t/h and the flow rate $F_G$ of the carrier gas is of 150 t/h.

In this specific example the gas distribution grid extends along the bending of the transport section for an angle of 30°, thus outside the teaching of present invention. The distribution grid is formed by a sequence of three trays, which are fixed to the wall of the transport section, so as to form slits in the overlapping area of adjacent trays. The angle comprised between the initial end of the distribution grid and the first slit is of 10°.

After a short period of time, of about 6 hours, the transfer of the copolymer along the transport section becomes problematic with partial melting of the copolymer particles and formation of polymer chunks inside the transport section. The generation of several polymer chunks finally causes the clogging of the transport section, making inoperable the polymerization reactor due to halt of polymer circulation between the downcomer and the riser.

The invention claimed is:

1. A gas-phase polymerization reactor having interconnected polymerization zones comprising:
   (i) a riser through which a plurality of polymer particles flow upwards under fast fluidization conditions or transport conditions;
   (ii) a dowcomer through which the plurality of polymer particles flow downward in a densified form under the action of gravity, the bottom of said downcomer being connected to a lower region of said riser by means of a transport section, said transport section being designed as a bend descending from the downcomer to the riser;
   (iii) said reactor being further provided with a line for feeding a carrier gas at the inlet of said transport section and with a gas distribution grid extending from the inlet of said transport section for an angle α of at least 50° along the bending of said transport section,
   wherein the gas distribution grid contains a plurality of slits, wherein a top end of the gas distribution grid and the first slit forms an angle lower than 25°.

2. The gas-phase polymerization reactor according to claim 1, wherein said angle α ranges from 55° to 75°.

3. The gas-phase polymerization reactor according to claim 1, wherein said gas distribution grid is formed by a plurality of adjacent trays fixed to the wall of said transport section so as to form the plurality slits in an area overlapping the adjacent trays.

4. The gas-phase polymerization reactor according to claim 3, wherein said plurality of slits are shaped so as to give an outlet gas flow which is tangential at the plane of said adjacent trays.

5. The gas-phase polymerization reactor according to claim 1, wherein the number of said plurality of slits along said distribution grid ranges from 3 to 10.

6. The gas-phase polymerization reactor according to claim 1, wherein the bottom of the downcomer converges into a troncoconically-shaped restriction whose walls form a vertical angle in a range of about 5 to 15°, wherein a control valve with an adjustable opening is placed within or just below said restriction, wherein a stream of a gas is fed into the lower part of the downcomer via a line placed at a distance above said restriction, wherein the distance is less than 1.5 times the diameter of the downcomer, and wherein said line is split into multiple lines arranged around a section of the reactor.

7. A process for the polymerisation of olefins in the presence of a solid catalyst component and a catalyst activator to produce a plurality of polymer particles, the process being performed in a gas-phase reactor having interconnected polymerization zones, where the plurality of polymer particles flow upward through a riser under fast fluidization or transport conditions, leave said riser and enter a downcomer through which the plurality of polymer particles flow downward in a densified form under the action of gravity, the process being characterized in that:
   (i) the plurality of polymer particles leave the bottom of said downcomer and are reintroduced into said riser by flowing along a transport section designed as a bend descending from said downcomer to said riser;
   (ii) a carrier gas is fed at the inlet of said transport section for pneumatically transferring the polymer along said transport section,
   wherein the reactor comprises a distribution grid comprising a plurality of slits,
   wherein said carrier gas passing through the plurality of slits of the gas distribution grid,
   wherein the gas distribution grid extends from the inlet of said transport section at an angle α of at least 50° along the bending of said transport section, and wherein a ratio, $F_G/F_P$, between a mass flow rate, $F_G$, of said carrier gas and a mass flow rate, $F_P$, of the plurality of polymers flowing along said transport section is from 0.05 to 0.60.

8. The process according to claim 7, wherein said carrier gas comes from a gas recycle line of said gas-phase reactor.

9. The process according to claim 7, wherein said carrier gas merges with the plurality of polymers coming from said downcomer after exiting from the plurality of slits of said distribution grid.

10. The process according to claim 7, wherein the flow rate, $F_P$, of the plurality of polymers flowing along said transport section is adjusted by varying the opening of a control valve placed within a restriction at the bottom of said downcomer.

11. The process according to claim 7, wherein the flow rate, $F_P$, of the plurality of polymers flowing along said transport section is adjusted by varying the flow rate of a dosing gas entering the bottom of said downcomer.

12. The process according to claim 7, wherein the ratio between a flow rate of a plurality of circulated polymers and a flow rate of a plurality of polymers discharged from the reactor ranges from 10 to 100.

13. A multistage process for the gas-phase polymerization of olefins carried out in a sequence of an upstream fluidised bed reactor and a downstream gas-phase polymerization reactor according to claim 1.

\* \* \* \* \*